April 28, 1931. N. LESSER ET AL 1,803,117
MOLDING MACHINE
Filed Feb. 25, 1927 8 Sheets-Sheet 2
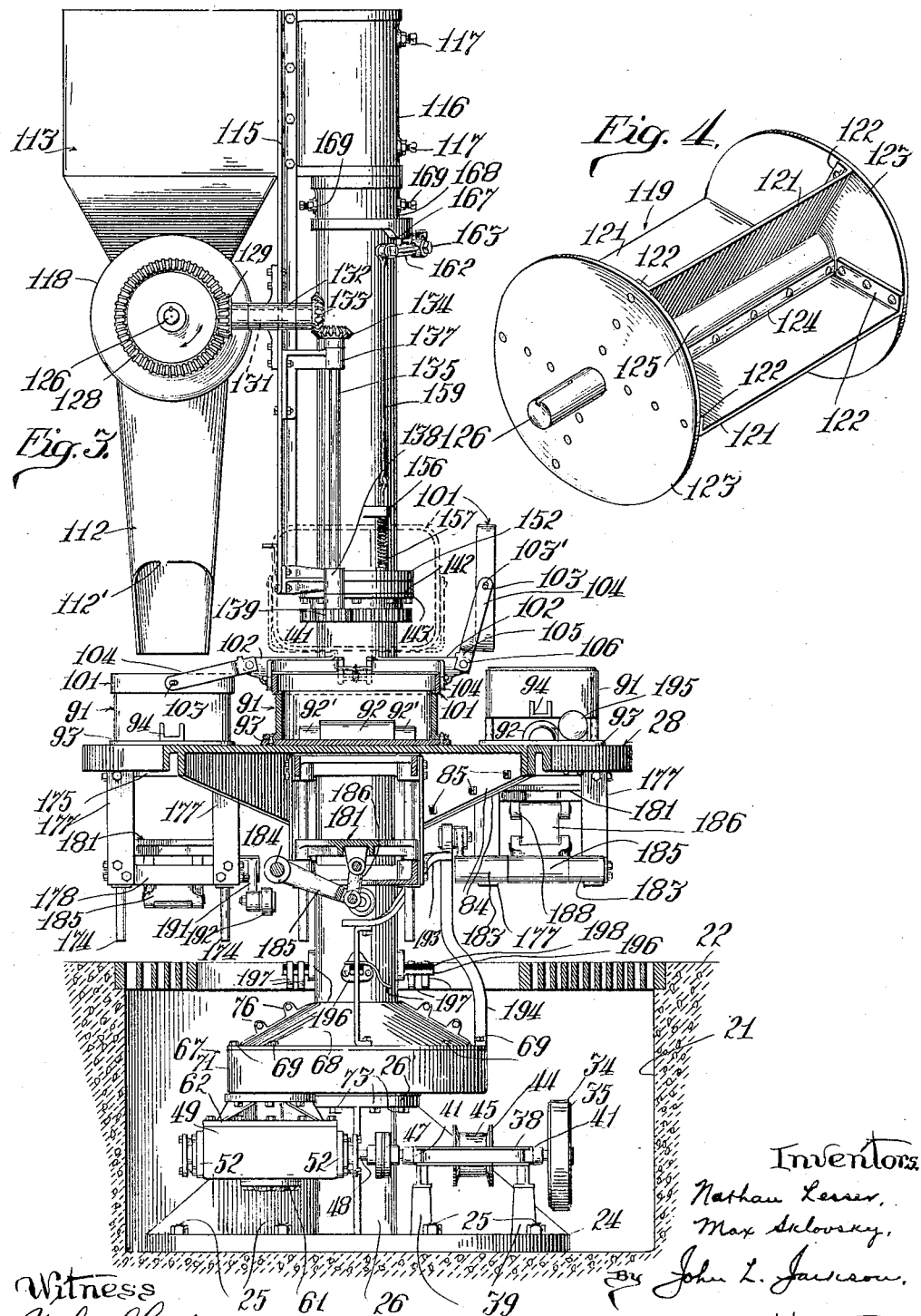

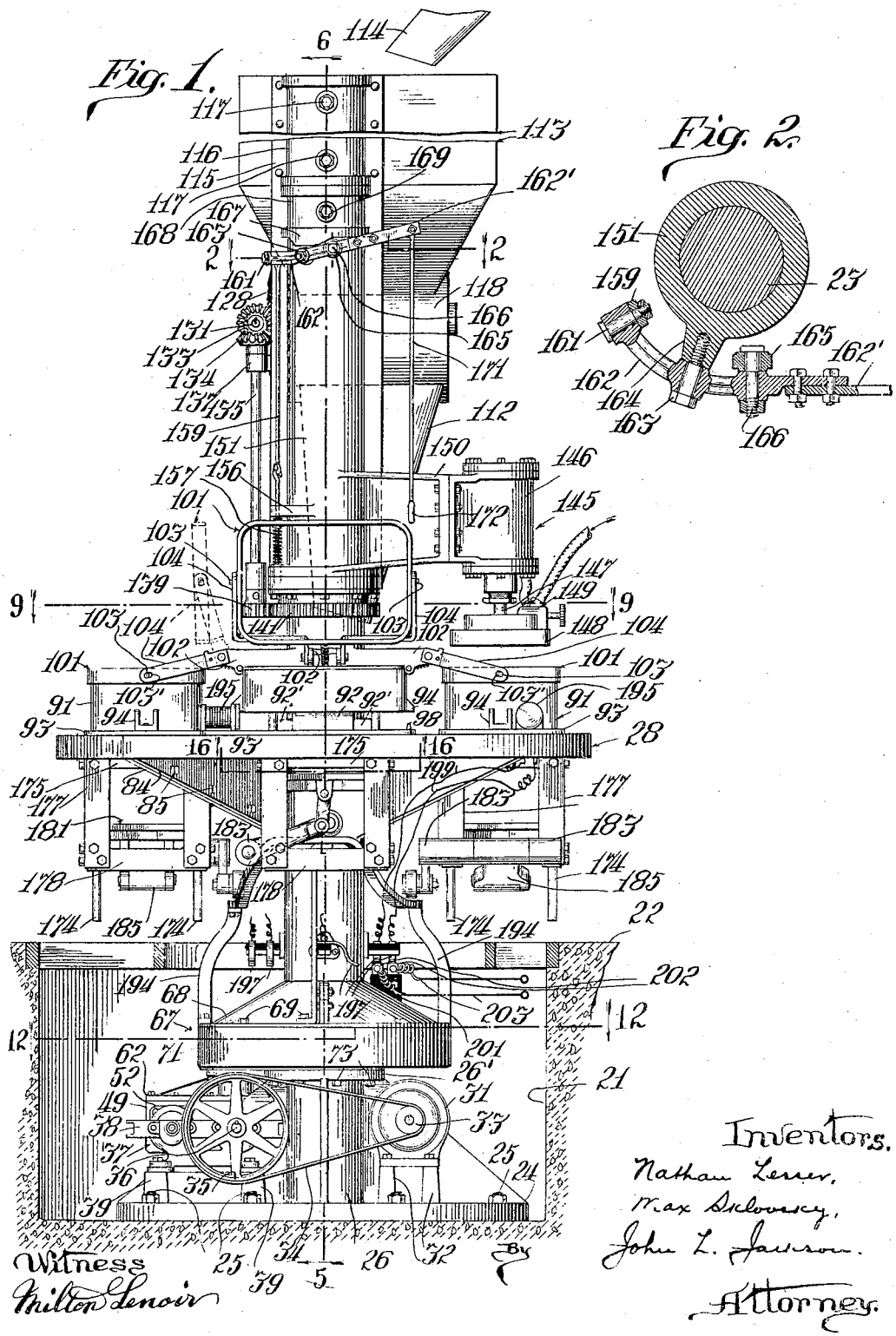

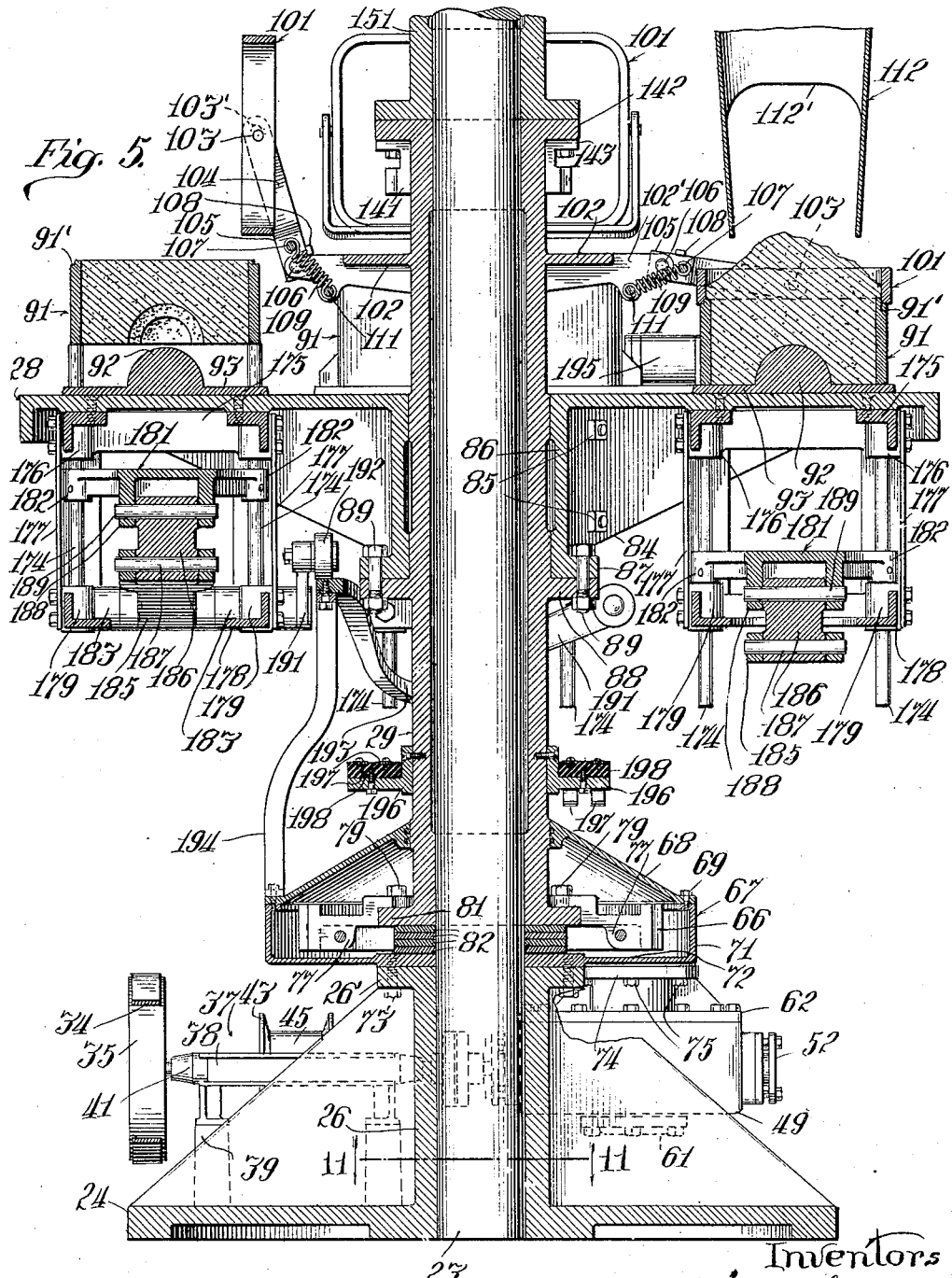

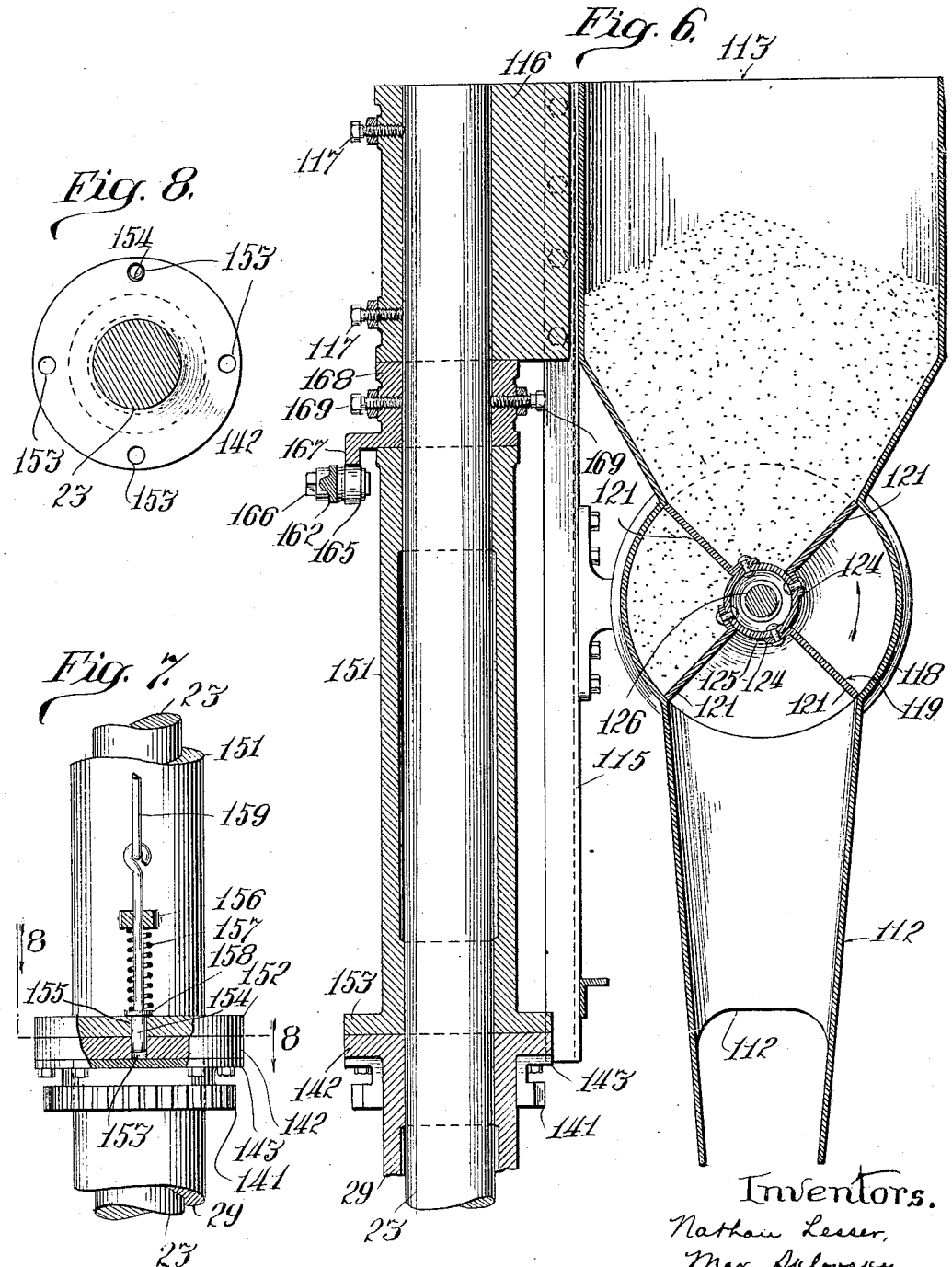

April 28, 1931.   N. LESSER ET AL   1,803,117
MOLDING MACHINE
Filed Feb. 25, 1927   8 Sheets-Sheet 5
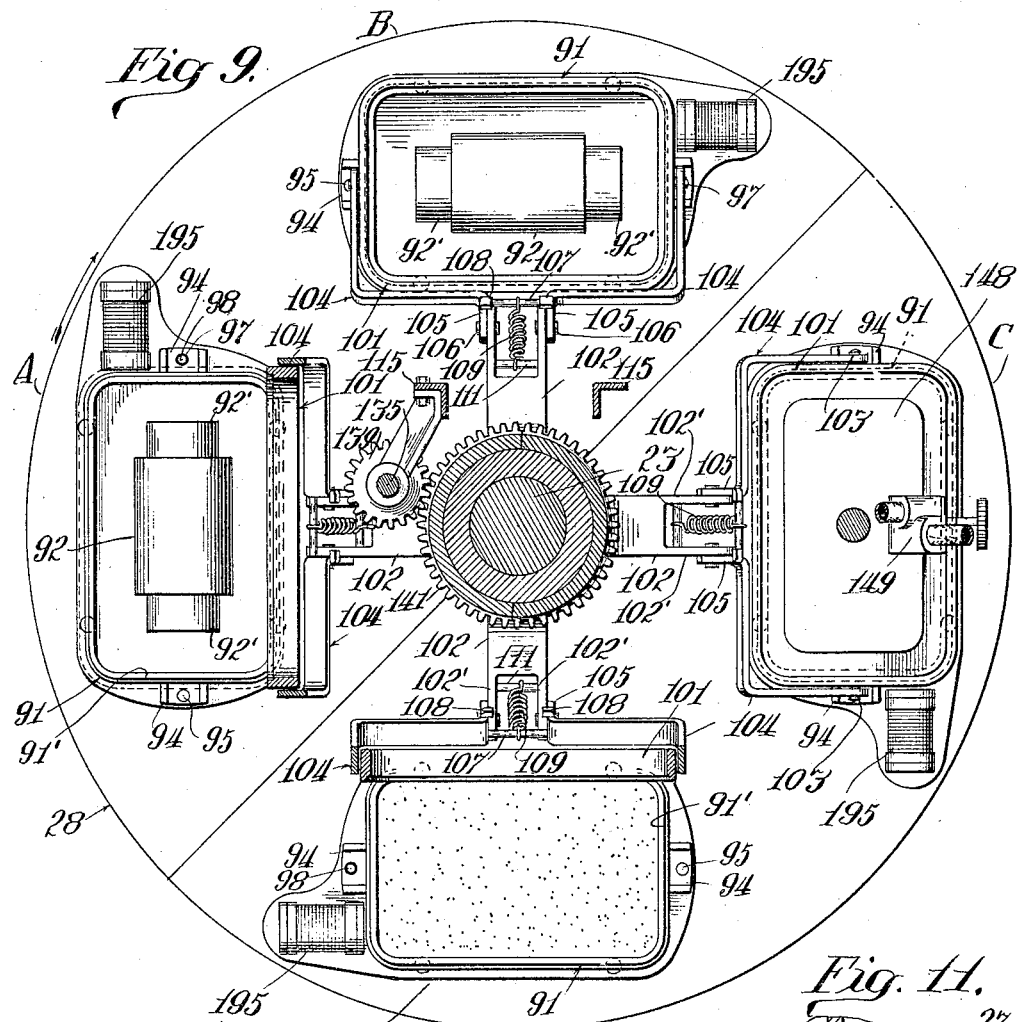
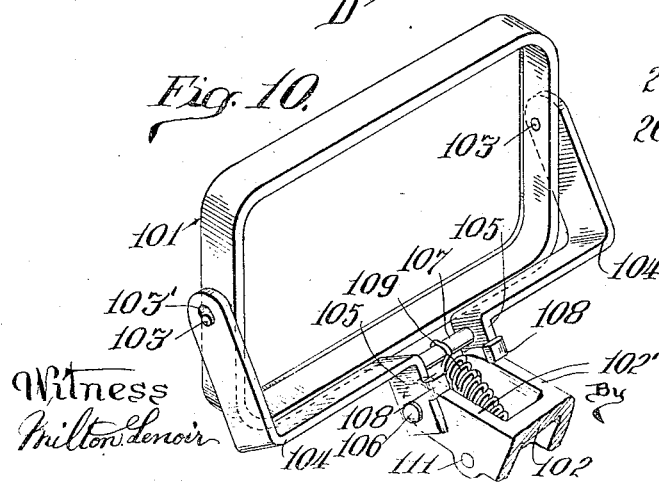
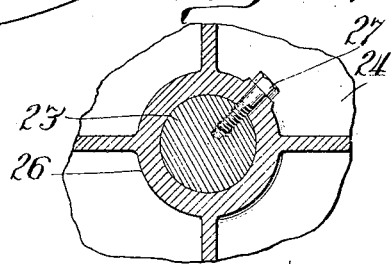

April 28, 1931.    N. LESSER ET AL    1,803,117
MOLDING MACHINE
Filed Feb. 25, 1927    8 Sheets-Sheet 6

Witness
Milton Lenoir

Inventors
Nathan Lesser,
Max Sklovsky,
John L. Jackson.
By
Attorne

April 28, 1931.  N. LESSER ET AL  1,803,117
MOLDING MACHINE
Filed Feb. 25, 1927    8 Sheets-Sheet 7
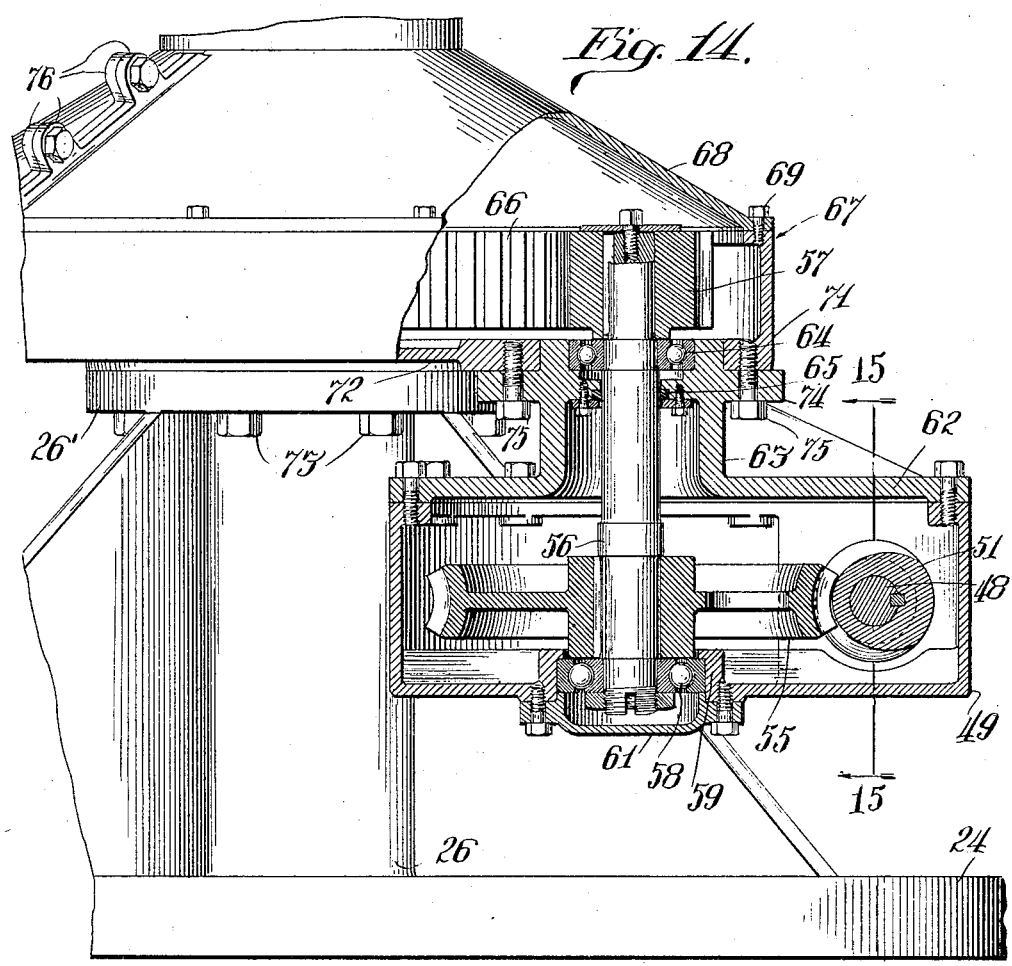
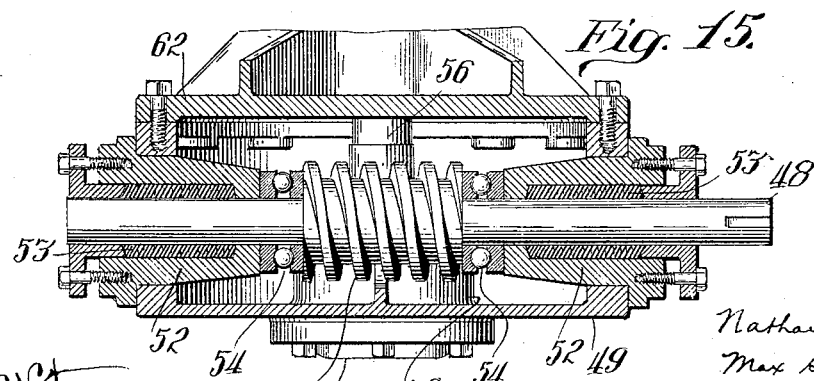

April 28, 1931. N. LESSER ET AL 1,803,117
MOLDING MACHINE
Filed Feb. 25, 1927 8 Sheets-Sheet 8
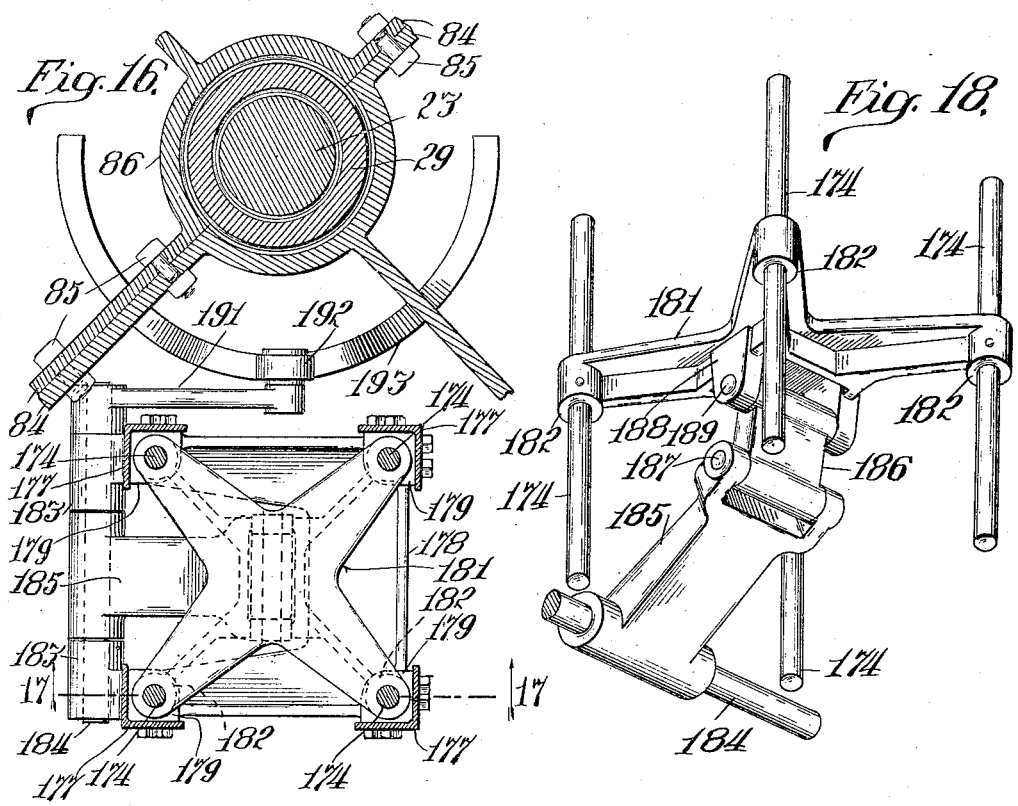
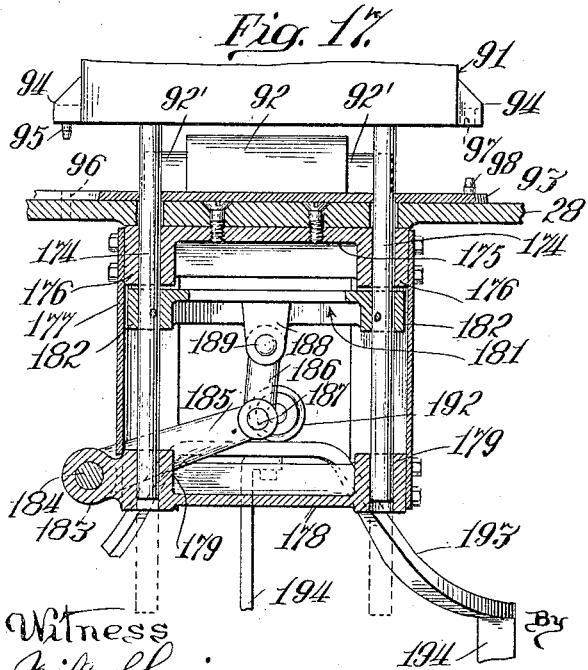
Witness
Milton Lenoir
Inventors.
Nathan Lesser,
Max Sklovsky,
John L. Jackson.
Attorney.

Patented Apr. 28, 1931

1,803,117

UNITED STATES PATENT OFFICE

NATHAN LESSER AND MAX SKLOVSKY, OF MOLINE, ILLINOIS, ASSIGNORS TO DEERE & COMPANY, OF MOLINE, ILLINOIS, A CORPORATION OF ILLINOIS

MOLDING MACHINE

Application filed February 25, 1927. Serial No. 170,772.

The present invention relates generally to molding machines such as are employed for the making of sand molds for foundry use. More specifically, the invention pertains to a machine of this class wherein the mold flasks are moved through a given path by suitable carrier mechanism which presents each flask successively to different operating stations or zones disposed at different points relative to such path of movement and where the different mold forming operations are performed.

One of the principal objects of the invention is to provide a machine of this general description wherein the several mold forming operations are carried on while the flasks are in continuous motion. This characteristic of the present machine obviously permits of a higher speed of operation and a greater output than is obtainable where each flask must come to a full stop in moving into each operating station or zone and thereafter resume motion in moving to the next station or zone. Such characteristic of continuous movement also avoids the possibility of heavy jarring and vibration, frequently set up in an intermittently moving carrier by sudden acceleration and deceleration, which heavy jarring and inertia is likely to spoil the pattern impressions in the molds.

A further object of the invention is to provide a relatively simple and compact molding machine wherein are performed, either automatically or under the control of an operator, the steps of filling each flask with sand, ramming the sand into the flask around the associated pattern, and then drawing or stripping the pattern from the flask by a relative separating motion between the two.

The invention also embodies numerous features pertaining to the details of certain of the operating parts, which features are disclosed at length in the following description of a preferred embodiment of the machine. In the drawings illustrating this embodiment:

Figure 1 is a side elevational view of the entire machine, the pit in the foundation or floor structure being illustrated in section to show the bottom portion of the machine.

Fig. 2 is a horizontal detail sectional view through the index pin releasing lever, taken approximately on the plane of the line 2—2 of Figure 1.

Fig. 3 is a side view, partly in elevation and partly in section, of the entire machine, as viewed from the left hand side in Figure 1.

Fig. 4 is a perspective view of the measuring and timing valve employed in the sand delivery mechanism.

Fig. 5 is an axial sectional view through the lower portion of the machine, and Fig. 6 is a similar sectional view through the upper portion of the machine, these two figures being taken on the same sectional plane indicated by the section line 5—6 of Figure 1.

Fig. 7 is a detail view, partly in section, illustrating the arrangement of the index pin for controlling the swinging movement of the sand ramming means.

Fig. 8 is a sectional view taken on the plane of the line 8—8 of Fig. 7.

Fig. 9 is a horizontal sectional view taken on the plane of the line 9—9 of Figure 1, looking down on the rotating carrier table.

Fig. 10 is a perspective view illustrating the spring biased pivotal mounting of each of the follow frames.

Fig. 11 is a transverse sectional view through the pedestal base of the machine, taken on the plane of the line 11—11 of Fig. 5.

Fig. 14 is a vertical sectional view through part of the driving train, taken on the plane of the line 14—14 of Fig. 12.

Fig. 15 is a sectional view taken on the plane of the line 15—15 of Fig. 14, illustrating the worm drive in the transmission train.

Fig. 16 is a detail sectional view taken approximately on the plane of the line 16—16 of Figure 1, illustrating the cam and associated lift mechanism for lifting each flask from its pattern.

Fig. 17 is a vertical sectional view through this same mechanism, taken on the plane of the line 17—17 of Fig. 16, and Fig. 18 is a perspective view of the spider and rods of this lift mechanism.

Figure 12:
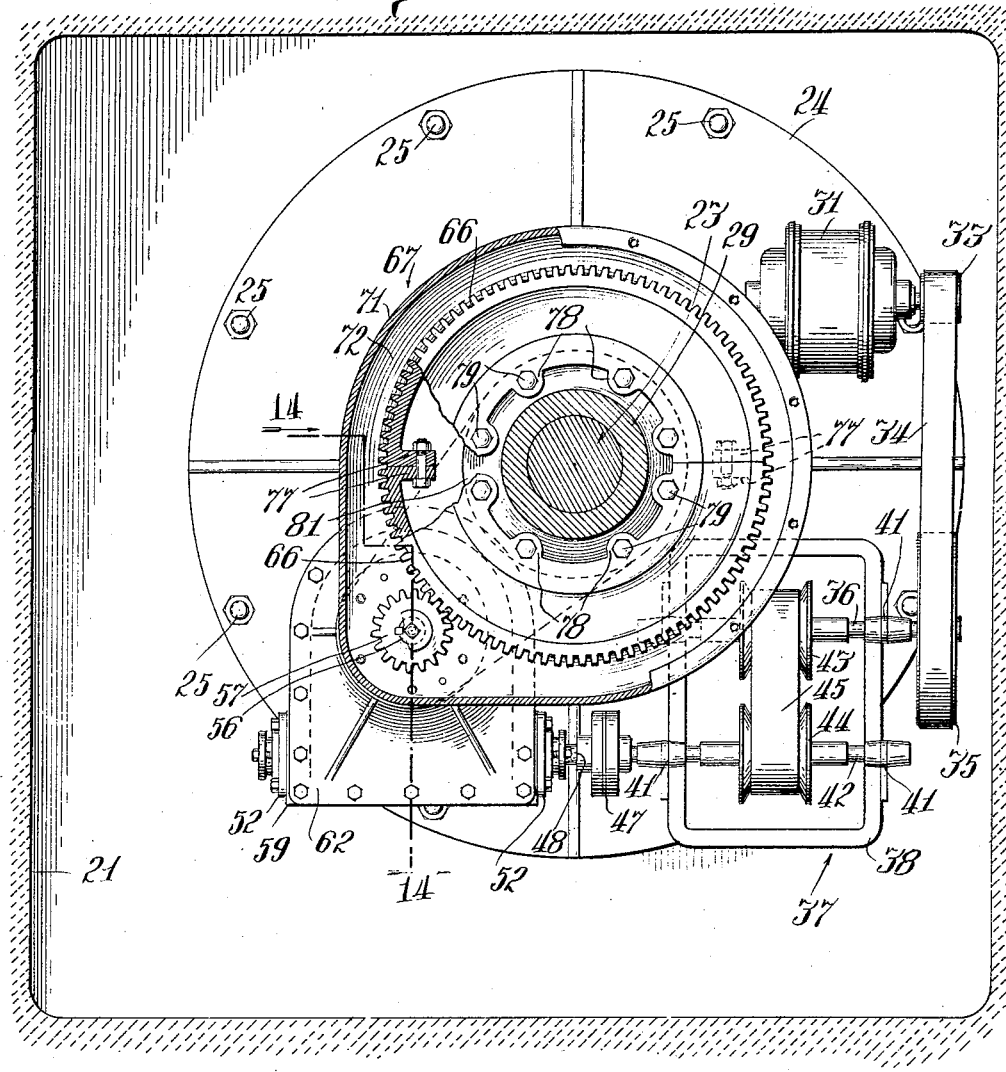
Fig. 12 is a horizontal sectional view taken on the plane of the line 12—12 of Figure 1, illustrating the driving train for rotating the revolving parts of the machine.

Referring to Figs. 1 and 3, which illustrate the machine in its entirety, the lower or base portion thereof is preferably set in a pit 21, or is otherwise supported below the floor surface 22 to dispose the rotating table surface, on which the molds are carried, at the proper height for convenient handling of the molds. The several parts of the machine are assembled around a vertical mast or spindle 23 which is rigidly secured at its lower end in a pedestal base 24 anchored in the bottom of the pit 21 by foundation bolts 25. The mast or standard 23 is fixedly held in a vertical sleeve socket 26 of the pedestal base by a set screw 27 (Fig. 11) or by any other suitable keying means. The rotating table on which the molds are formed is indicated generally at 28, this table being supported on a rotating sleeve 29 (Fig. 5) journaled on the standard 23 above the pedestal. The rotation of the sleeve 29 revolves the table 28 and also transmits operating energy to the other moving parts of the machine, as we shall hereinafter describe.

The driving means for rotating the sleeve 29 is disposed in the pit 21 and comprises an electric motor 31 (Fig. 12) supported on standards 32 carried by the bottom flange of the pedestal base 24. From a pulley 33 on the armature shaft of this motor a belt 34 passes around a relatively larger pulley 35 mounted on a shaft 36. This shaft 36 constitutes one element of a speed adjusting mechanism 37 of a well known commercial type which comprises a rectangular frame 38 suitably supported on standards 39 rising from the pedestal base and being provided at its opposite sides with bearings 41 for the shaft 36 and for a secondary shaft 42. In such structures, the two shafts carry cooperating belt pulleys 43 and 44 respectively, over which travels a belt 45, these pulleys having expansible and contractible peripheries by means of which the speed of rotation transmitted to the driven shaft 42 may be adjusted.

This latter shaft connects through a coupling 47 with a shaft 48 entering a worm gear housing 49 and carrying a worm 51 thereon (Fig. 15). The shaft 48 is journaled in removable bearing bushings 52 carried by the end walls of the housing 49 and provided with any suitable gland packings 53 for preventing the leakage of lubricant from the housing.

Suitable anti-friction thrust bearings 54 are interposed between the worm 51 and the ends of the bearing bushings 52 to sustain the thrust of the worm. The latter meshes with a worm wheel 55 mounted on a vertical spindle 56 carrying a spur pinion 57 at its upper end (Fig. 14). The lower end of this spindle is supported in an anti-friction bearing 58 centered in an annular boss 59 extending upwardly from the bottom wall of the housing 49. The bottom opening of the boss 59 is closed by a removable cap plate 61 through which the bearing 58 can be assembled and removed.

The removable cover 62 of the housing 49 is formed with an upwardly extending tubular boss portion 63 through which the spindle 56 extends, such boss portion supporting an anti-friction bearing 64 for the upper part of the spindle. A suitable compressible packing 65 surrounds the spindle within the tubular boss portion 63 to prevent the leakage of lubricant along the spindle.

Figure 13:
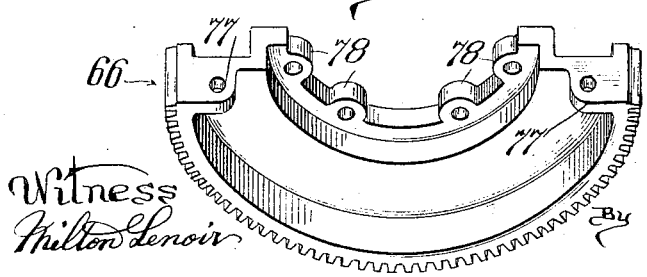
Fig. 13 is a perspective view of one of the split gear sections illustrated in Fig. 12.

The pinion 57 meshes with a relatively large spur gear 66 which is mounted directly on the lower end of the vertical driving sleeve 29. A stationary housing 67 encloses the pinion 57 and gear 66, such housing comprising a conical cover portion 68 removably secured by cap screws 69 to a lower casing section 71. This lower casing section has a bottom wall 72 completely closing the bottom of such housing 67 and being fixedly secured to the pedestal base 24 by cap screws 73 which pass up through a flange 26' at the upper end of this pedestal base and into the bottom wall 72 (Fig. 5). The tubular boss 63 of the worm gear housing 49 is formed with an outwardly extending flange 74 through which passes screws or bolts 75 extending up into this bottom wall of the upper spur gear housing 67, whereby the worm gear housing is fixedly supported in suspended relation below the spur gear housing. As shown in Figs. 3 and 14, the cover portion 68 of the spur gear housing is split into two or more sections for assembly over the lower end of the driving sleeve 29, such sections being provided with suitable bolting ears 76 by which the sections can be clamped together. The large spur gear 66 is similarly constructed as a split ring gear consisting of two or more sections (Fig. 13), the abutting faces of the sections having apertured lugs or ears 77 by which the sections are clamped together around the sleeve 29. Each section of this gear is also provided with a plurality of inwardly extending bolting lugs 78 receiving bolts or cap screws 79 passing down into a flange 81 extending outwardly from the lower end of the sleeve. A plurality of thrust washers 82 are interposed between the lower end of the sleeve and the stationary bottom wall 72 of the spur gear housing to carry the downward thrust of the sleeve and the superimposed parts mounted thereon.

It will be evident from the foregoing that the operation of the electric motor 31 will transmit driving rotation through the speed adjusting mechanism 37 to the worm gearing 51—55, and this gearing will in turn transmit a slow speed driving rotation through the spur gearing 57 and 66 to the rotatable driving sleeve 29. As before stated, by properly adjusting the belt pulleys 43 and 44 of the speed adjusting mechanism 37, any desired speed of rotation of the sleeve 29 may be obtained that is most satisfactory for the mold forming operations to be performed.

The rotating table 28 is also split into two sections for assembly on the sleeve 29, the abutting faces of each of these sections having depending ribs 84 adapted to receive bolts 85 (Fig. 5), by which the two sections are clamped together. The ribs 84 are formed integral with a split hub 86 embracing the sleeve 29 and having an outwardly extending flange 87 at its lower end which rests on an outwardly extending flange 88 projecting from the sleeve, the two flanges being secured together by bolts 89 which compel rotation of the table with the sleeve. The table may be arranged for mounting any number of flasks, depending upon the size of the flasks and the other requirements of the particular mold forming operation. In the exemplary construction shown we provide for mounting four flasks on the table, such being the preferred number for cooperation with the particular mold forming steps shown in the present machine. These flasks, or half-flasks 91, are adapted to be placed at equidistantly spaced points about the table, as predetermined by the location of the patterns or pattern sections 92 on the table.

Each of the patterns is illustrated as being a split plate pattern comprising a plate portion 93 detachably secured to the surface of the table. For simplicity of illustration we have shown a pattern form which is symmetrical in contour, in which case the several patterns about the table are all duplicates; that is to say, that half of the mold formed over one pattern will—with the pattern design illustrated—be a duplicate of that half of the mold formed over the next succeeding pattern section on the table so that when these two mold halves are placed together the pattern impressions therein will coincide to form a symmetrical mold. Where the two halves of the split pattern are not duplicates, the different pattern sections will preferably alternate in their placing on the table 28, so that the mold section formed over one pattern will be adapted for matching with the mold section formed over the next preceding or succeeding pattern for forming a completed mold. Obviously, the pattern may be arranged in other combinations for forming single or multiple section molds, and provision may be made for receiving cores where desired, the reduced pattern extensions 92' (Fig. 9) being typical of a pattern intended to leave core prints in the mold for receiving a core. This construction and arrangement of the patterns is all within the common knowledge of the pattern making art and requires no detailed description. To insure proper registration of each flask 91 with each pattern 92, lugs 94 are provided on the ends of the flask, one of such lugs having a dowel or registering pin 95 for reception in an opening 96 in the pattern plate, and the other of such lugs having an opening 97 for receiving a dowel or registering pin 98 projecting from the pattern plate (Fig. 17). These registering pins and sockets on the flasks also serve to secure proper registration between the flasks when they are removed from the table and joined in the completed mold.

For convenience of reference we have designated the several stations or zones to which the successive flasks are conveyed by the rotating table for the performance of the mold forming operations thereon (see Fig. 9). "A" represents approximately that point in the rotation of the table where the flasks are first placed on the table over the patterns, corresponding to the first step of the cycle. "B" represents approximately that point in the movement of each flask where the sand is poured into the top of the flask from overhead sand feeding mechanism. "C" represents approximately that point at which the sand is tamped or rammed into the flasks by suitable sand ramming means; and "D" represents approximately that point where the flask is drawn or stripped from the pattern, preparatory to the flask being removed from the table and joined with its companion flask in completing the mold. As each flask is placed upon the table a follow frame 101 is brought down to engage around the upper edge of the flask, such follow frame forming an extension for temporarily increasing the effective depth of the flask. The purpose of this follow frame is to prevent the overflow of sand from the upper edge of the flask as the sand is being dumped into the latter, and also to prevent any spilling of the sand from the flask as the sand is being tamped or rammed down into the flask by the sand ramming means. There are four of such follow frames supported above the table, one for each of the flasks thereon. As shown in Figures 5 and 10, each follow frame is pivotally supported on an individual bracket 102 projecting outwardly from the rotating sleeve 29, whereby these follow frames rotate with the table in registry with the different pattern positions. Each frame is pivotally supported on pivot pins 103 engaging in slots 103' in the arms 104 of a yoke or bail. These bail arms have laterally turned ends 105 which engage over the outer sides of the two bracket arms 102', the bail portions being pivoted to these arms on separate pivot pins 106. A bar or pin 107 extends between the laterally bent portions of the bail arms and rigidly joins both bail sections as a single unit. Stop lugs 108 project inwardly from the bail extensions 105 and are adapted to strike the upper edges of the bracket arms 102′ for limiting the upward swinging movement of the bail. A tension spring 109 is connected at one end to the bar or pin 107, and at the other end to a pin 111 extending between the bracket arms below the centers of the pivots 106. This spring functions as a biasing member for holding the follow frame either in its upright disengaged position, or in its horizontal operative position on the top of the flask. For example, referring to Figure 5, the upper frame at the left hand side of the machine is illustrated as being in its raised position, at which time the tension spring 109 is extended along a line disposed above the pivotal center of the pivots 106 for holding the bail substantially upright with the stop lugs 108 engaging with the bracket arms; and the follow frame illustrated at the right hand side of this figure is illustrated as being in its horizontal operating position, at which time the tension spring is extended on a line below the pivots of the bail for yieldingly holding the follow frame pressed down against the top of the flask. The upper edge of each flask may, if desired, be provided with a notch 91′ around its outer sides for receiving the lower edge of the follow frame. The slots 103′ in the bail arms permit accurate registering of the follow frame with the upper edge of the flask.

As each flask is placed upon the continuously moving table at station A, the corresponding follow frame is snapped down to engage over the edge of the flask, and in this condition the flask is conveyed to station B. Here the flask moves under a stationary sand chute 112 through which sand is dumped into the flask. The sand feeding mechanism comprises an upper hopper 113 for storing a considerable volume of the conditioned or green sand, such being supplied to the hopper from a suitable source of supply through the chute 114 (Fig. 1). The hopper is secured to a stationary frame comprising two vertically extending angle bars 115 which are bolted at their upper ends to a block or collar 116 mounted on the upper end of the stationary standard 23. Set screws 117 adjustably secure this supporting member to the standard, it being evident that by loosening these set screws the hopper and chute assembly 113—112 can be rotated to dispose the chute 112 over any desired point of the table in the sand filling zone B.

Formed intermediate the delivery chute 112 and hopper 113 is a cylindrical portion 118 in which rotates a sand measuring and timing valve 119. This valve comprises a plurality of radially extending vanes 121 defining pockets therebetween which receive predetermined charges of sand and dump the sand down through the chute 112 in timed sequence with the movement of the flasks below the end of the chute. In the construction shown (Fig. 4), these vanes have laterally bent end portions 122 which are riveted to end heads 123, and also have laterally bent portions 124 at their inner edges which are riveted to a tubular hub 125. This valve is keyed or otherwise secured to a shaft 126 having bearing support in suitable bearings carried by the end heads of the cylindrical casing portion 118. At one end the shaft 126 projects beyond its bearing for receiving a large bevel gear 128 (Fig. 3). Meshing with this bevel gear is a bevel pinion 129 mounted on a shaft 131 journaled in a bearing bracket 132 which is bolted to one of the frame uprights 115. The other end of the shaft 131 mounts a bevel gear 133 which meshes with another bevel gear 134 secured to the upper end of a vertically extending drive shaft 135. The upper and lower ends of this shaft are journaled in bearing brackets 137 and 138 secured to the frame member 115. Secured to the lower end of the shaft 135 is a spur pinion 139 which meshes with a relatively large spur gear 141 rotating with the main drive sleeve 29. The upper end of such sleeve is formed with a laterally extending flange 142 to which the spur gear 141 is secured (Fig. 5), the gear being split into two or more sections for assembly over the sleeve and having flange portions 143 which are bolted or otherwise secured to the underside of the flange 142. It will be evident from the foregoing that in the rotation of the table 28 and sleeve 29 a drive will be transmitted through the gears 141 and 139 to the shaft 135 and thence through the previously described bevel gearing to the revolving sand valve 119, whereby as each flask comes into registry with the lower end of the discharge chute 112 a predetermined volume of sand will be dumped into the top of the flask concurrently with its continuous movement below the chute. If desired, the wall at the leading edge of the discharge chute 112 may be cut away, as indicated at 112′ in Figure 3, and the wall at the trailing edge of the chute left solid down to the bottom edge of the chute, for leveling or distributing the sand within the flask as the latter moves beneath the chute. As shown in Figure 5, the volume of sand as measured by the valve 119 fills each flask and also extends up into the space defined by the follow frame 101.

As soon as each flask moves out from beneath the sand delivery chute, it comes into the sand ramming zone generally indicated at C, where a suitable sand ramming unit, indicated generally at 145 in Figure 1, is brought into registry with the flask and is operated to ram the sand down into the flask. This sand ramming unit may be electrically operated or it may employ a fluid under pressure, such as air or steam, for securing its sand compacting pressure. In the construction shown, we have illustrated a unit of the latter type, comprising a compressed air cylinder 146 from which extends a piston rod 147 carrying a pressure board or plate 148 at its lower end. Such plate approximates the form of the flask and is of substantially the same area as the flask for exerting ramming pressure over the entire body of sand. A suitable valve 149 on the unit controls the admission of compressed air to the cylinder 146. The cylinder is bolted to the outer end of a heavy bracket or arm 150 projecting from a sleeve 151 mounted on the standard 23. This sleeve is capable of oscillatory swinging movement around the standard so as to enable the sand ramming unit to be brought into registry with each flask as it moves out from beneath the sand delivery chute, and to remain in registry with the flask during a considerable part of its rotative movement so that the ramming pressure will be effective on the sand for an appreciable interval. To insure that the sand ramming unit will be brought into accurate registry with each flask, and will remain in such registry during the concurrent movement of the flask and ramming unit through the sand ramming zone C, suitable registering mechanism is provided for clutching or locking the ramming unit 145 to the flask supporting table, which registering mechanism we shall now describe. Referring to Figures 6 and 7, the sleeve 151 is provided at its lower end with a flange 152 which bears on the flange 142 of the continuously rotating sleeve 29. Formed in the flange 142 are a plurality of holes 153 located at predetermined points relative to the flasks on the table and corresponding in number to the number of flasks or pattern positions on the table. These holes constitute sockets for an index or registering pin 154 which is carried by the sleeve 151 and which is adapted to snap down into these sockets successively in compelling movement of the latter sleeve concurrently with the main drive sleeve 29. This index pin is guided at its lower end in an opening 155 in the flange 152, and at its upper end in a lug 156 extending from the side of the sleeve 151. A compression spring 157 is confined between such lug and a collar 158 on the pin, whereby the spring normally tends to thrust the pin downwardly into one of the holes 153 when such hole comes into alinement with the pin. The upper end of the the pin is connected to a link 159 extending upwardly and pivotally connected at 161 to one end of a rocking lever 162. Referring to Figures 1 and 2, this lever is curved slightly to extend around the upper portion of the sleeve 151 and is pivotally supported intermediate its ends on a pivot screw 163 extending into a boss 164 projecting from the sleeve. The other arm of the lever carries a roller 165 pivoted on a stud 166 and adapted to contact with a curved cam flange 167 which is fixedly mounted on the standard 23 above the sleeve 151. As shown in Figure 6, the cam flange 167 is formed as an integral part of a collar 168 which is secured to the standard by set screws 169. By loosening these set screws the collar 168 can be rotated to any desired position for adjusting the time of tripping when the index pin is withdrawn from the hole 153 in the flange 142 for freeing the sleeve 151 and interrupting the swinging movement of the sand ramming unit 145. As shown in Figure 1, the lever 162 has an extending portion 162' to which is connected depending rod 171 having a handle 172 conveniently located adjacent the sand ramming unit. By applying a downward pull on this handle the index pin may be released for interrupting the swinging movement of the sand ramming unit at any point in its path of travel; and, in the event that the index pin is not thus manually released the sand ramming unit will travel to the limit of its desired path of movement, whereupon the roller 165 on the lever 162 will engage the cam rise 167 and automatically trip the index pin for stopping further movement of the sand ramming unit.

As each flask moves out of the sand ramming zone C, it comes into the zone D where the operation of drawing or stripping the flask from the pattern is performed. This latter operation is effected by a plurality of rods 174, preferably four in number, which are associated with each pattern plate and which are adapted to move up through apertures in the pattern plate for engaging with the lower edges of the flash and raising the same up above the pattern. Referring particularly to Figures 16, 17 and 18, below each pattern position is secured a rectangular plate or frame 175 having apertured bosses 176 at its corners, through which bosses the rods 174 are adapted to slide. Short sections of angle plates or bars 177 are secured to the outer sides of these bosses and depend therefrom for supporting at their lower ends a generally similar plate or frame 178 having corresponding apertured bosses 179 at its corners. The upper and lower bosses 176 and 179 afford vertically spaced guides for guiding the reciprocatory movement of the rods 174. The several rods are moved in unison by a spider 181, the arms of which have bosses 182 in which the rods 174 are pinned or otherwise secured. At one side of the lower plate or frame 178 horizontal pivot bosses 183 extend from the vertical guide bosses 179 and support an oscillatory shaft 184. Secured to the shaft intermediate such bearing bosses is an arm 185, the end of which is bifurcated to receive the lower end of the link 186, the latter being pivotally connected in the bifurcated end of the arm 185 on a pivot pin 187. The upper end of the link 186 extends between two spaced pivot ears 188 depending from the bottom side of the spider 181, a pivot pin 189 pivotally connecting the link between these ears. The oscillatory shaft 184 is actuated through an arm 191 which is secured to the projecting inner end of said shaft. A roller 192 is pivotally mounted on the swinging end of this arm, and this roller is adapted to engage with an arcuate cam track 193 disposed in the path of the roller 192 directly below the flash drawing zone D. Referring to Figures 1 and 3, this cam track is supported on a plurality of arms 194 which are bolted to the underside of the cam track and which are secured at their lower ends to the stationary gear housing 67. The weight of the spider 181, rods 174, etc., normally holds these rods in their lowered positions with their upper ends below the surface of the pattern plate 93. As soon, however, as the roller 192 on the operating arm 191 rides up the cam track 193 the shaft 184 is oscillated and thereby the rods 174 are caused to move upwardly through the alined apertures in the table and in the pattern plate for lifting the flask up above the pattern. As before stated, the rise in the cam track 193 is positioned so that this flask drawing operation will occur as each flask moves into that part of its movement generally indicated by the zone D. A similar arrangement of flask lifting rods and cooperating parts is associated with each pattern, but these mechanisms are all duplicates, and a description of one will suffice for all. It will be understood that before the flask reaches the point in its travel where this drawing or stripping operation is to occur, one of the operators swings the follow frame 101 up off the top of the flask to its upper disengaged position, so that this follow frame will not interfere with the lifting of the flask.

Preparatory to, or simultaneously with the separation of the flask and pattern it is desirable to "rap" the pattern lightly to loosen the sand particles from the pattern and insure a clean separation of the impression from the latter. To accomplish this we mount on each pattern plate 93 an electrically operating vibrator or "rapper" 195, preferably of the solenoid type, for rapping the pattern. It is desirable that such rapping of the patterns only occur just before or during the time that the flasks are being drawn or stripped from the patterns. To this end we have provided means which will energize each solenoid selectively at the proper time in the rotation of the table. Such means comprises a plurality of brackets 196, one for each solenoid, mounted on the rotating sleeve 29 below the table. Each of these brackets supports a pair of contact fingers 197, suitably insulated from the bracket, as by an interposed block of insulation 198. The contact fingers 197 are connected through wires 199 with their individual solenoids. Mounted on the cover portion 68 of the spur gear housing is an insulating block 201 on which are secured two spaced contact terminals 202 which are electrically connected through wires 203 with a suitable source of current supply. The rotation of the table 28 and sleeve 29 will bring each pair of contact fingers into engagement with the terminals 202 for energizing the solenoid associated with such contact fingers, the terminals 202 being positioned, as above remarked, at such point in the rotative movement of the table that each solenoid will be energized just before or during the operation of lifting the flask from the pattern.

The general operation of the machine will be apparent from the foregoing description. Preferably two operators attend to the placing and removing of the flasks and to the operation of the sand ramming unit. One operator removes the flasks from the ends of the lifting rods 174 and places empty flasks back over the patterns as soon as the rods move down to their retracted position, such operations being performed at the stations D and A. He also swings the follow frames 101 down into engagement with the empty flasks, and places any chills, chaplets, facing sand, etc. which may be required within the flasks. Incidentally this same operator can assemble the two half-flasks of each mold as these flasks are removed from the table. The other operator swings the sand ramming unit into registry with each flask as it moves out from beneath the sand delivery chute, and causes operation of such ramming unit by opening the valve 149. The registration of the ramming unit with each flask occurs practically automatically, by the clutching of the two sleeves 29 and 151 together through the index or clutch pin 154. This operator can allow the ramming unit to continue in operative engagement with the flask until the clutch pin is automatically tripped by the cam 167 at the end of the predetermined movement of the unit, or he can manually release the sand ramming unit at any intermediate point by pulling on the handle 172. After the unclutching of the ramming unit from the driving sleeve the unit is swung back for registry with the next succeeding flask. This second operator can raise the follow frames from the flasks before the latter are lifted from the patterns by the rods 174. Any excess sand lying above the upper edge of the flask after the raising of the follow frame can be stripped off by either operator.

While we have shown what we consider to be the preferred manner of carrying out our invention, we do not consider the invention limited to the details of this specific disclosure nor to the precise steps described, as such may be modified considerably within the metes and bounds of the invention.

What we claim as our invention and desire to secure by Letters Patent, is—

1. In a molding machine, the combination of a continuously moving carrier adapted to convey flasks in a mold forming operation, continuously driven sand feeding means adapted to discharge predetermined measured quantities of sand into said flasks, in timed sequence with the movement of said flasks past said feeding means, and means for impacting the sand within said flasks during the continuous movement of the latter, said means being operable in spaced time relation to said sand feeding means.

2. In a molding machine, the combination of a continuously rotating carrier adapted to convey flasks in a mold forming operation, a sand delivery chute above the path of said flasks, measuring valve means for causing a discharge of measured quantities of sand from said chute, gear mechanism driven from said carrier for continuously rotating said valve means in timed sequence with the movement of said flasks below said chute and means for impacting the sand within said flasks after the sand has been deposited by said measuring valve means, said impacting means being operable as the rearward flask is receiving its sand.

3. In a molding machine, the combination of a rotating table adapted to convey flasks through different steps of a mold forming cycle, a sand delivery chute above said table, a sand hopper supplying said chute, and a rotating measuring valve interposed between said hopper and said chute and driven in synchronism with said table for delivering measured quantities of sand to said chute in timed sequence with the movement of said flasks below said chute.

4. In a molding machine, the combination of an upright standard, a table rotating about said standard and adapted to convey flasks through different steps of a mold forming cycle, sand delivery mechanism adapted to discharge into said flasks, said sand delivery mechanism being supported on said upright standard to place its point of discharge above the path of travel of the flasks, and means for impacting the sand within said flasks said table being rotatable relatively to said impacting means.

5. In a molding machine, the combination of means for imparting continuous movement to successive flasks through a given path, and means for impacting sand within said flasks during the continuous movement of the latter in said path, said impacting means remaining in a definite impacting zone relatively to the travel of said first named means.

6. In a molding machine, the combination of a moving carrier adapted to convey flasks through a given path in a mold forming operation, and sand ramming means operating on each flask through a part of the movement of the latter, said sand ramming means being movable counter to the movement of said carrier.

7. In a molding machine, the combination of a moving carrier adapted to convey flasks in a mold forming operation, and means for ramming the sand in said flasks, said ramming means being arranged for movement concurrently with and oppositely to the movement of said carrier.

8. In a molding machine, the combination of a moving carrier adapted to convey flasks in a mold forming operation, sand ramming means operating on each flask, and releasable means for connecting said sand ramming means to said carrier for synchronous movement therewith, said sand ramming means being mounted for movement independently of said carrier upon the release of said releasable means.

9. In a molding machine, the combination of an upright standard, moving means associated with said standard adapted to support a mold flask, and sand ramming means supported for rotation concentrically of said standard and independently of said moving means.

10. In a molding machine, the combination of an upright standard, a support rotating about said standard and adapted to convey a plurality of mold flasks, and sand ramming means mounted for rotation concentrically of the axis of rotation of said support and adapted for rotation independently of said support.

11. In a molding machine, the combination of an upright standard, means rotating in one direction relatively to said standard and adapted to support a plurality of mold flasks, and sand ramming means supported for rotation in either direction about the axis of said standard for cooperating with said mold flasks.

12. In a molding machine, the combination of an upright standard, a table rotating concentrically of said standard and adapted to support the mold flasks, an arm supported on said standard and extending over said table, and sand ramming means carried on said arm for cooperation with said flasks, said arm and sand ramming means being rotatable concurrently with said table and being rotatable in the opposite direction to the rotation of said table.

13. In a molding machine, the combination of an upright standard, a table rotating about said standard and adapted to convey mold flasks, an arm supported on said standard and extending over said table, sand ramming means carried on said arm for cooperation with said flasks, and means for operatively connecting said arm with said table to cause rotation of said sand ramming means with said table, said connecting means being releasable and said arm and sand ramming means being thereupon rotatable in the opposite direction to bring said ramming means into cooperation with a succeeding flask.

14. In a molding machine, the combination of a rotating carrier adapted to convey flasks through different steps of a mold forming cycle, sand ramming means operating on said flasks, driving means moving in synchronism with said carrier, means for clutching said sand ramming means to said driving means for rotative movement with said carrier, and means for automatically releasing said clutching means after said sand ramming means has moved to the end of a predetermined path.

15. In a molding machine, the combination of a moving carrier adapted to convey flasks in predetermined positions thereon through different steps of a mold forming cycle, driving means associated with said carrier, sand ramming means operating on said flasks, means for clutching said sand ramming means to said driving means, means for manually releasing said clutching means, and means for automatically releasing said clutching means after said sand ramming means has moved through a predetermined path.

16. In a molding machine, the combination of a moving carrier adapted to convey flasks, in predetermined positions thereon, through different steps of a mold forming cycle, driving means moving in synchronism with said carrier, sand ramming means operating on said flasks, and clutch mechanism for optionally connecting said sand ramming means to said driving means for movement concurrently with said carrier, said clutch mechanism having predetermined engaging positions for obtaining operative registration between said sand ramming means and each of said flasks.

17. In a molding machine, the combination of a continuously moving carrier adapted to convey a flask through a mold forming operation, a sand ramming device adapted to compact the sand within said flask and adapted for movement independently of said carrier, and means for causing said sand ramming device to move concurrently with said carrier, said latter means predetermining operative registration between said sand ramming device and said flask.

18. In a molding machine of the class described, the combination of a continuously moving carrier adapted to convey a flask thereon through different steps of a mold forming cycle, sand ramming means adapted to compact the sand within said flask, a driving member moving in synchronism with said carrier, a driven member operatively connected to said sand ramming means for causing movement of the latter along the path of movement of said carrier, and releasable means for operatively connecting said members for causing movement of said sand ramming means with said carrier, said releasable means predetermining operative registration of said sand ramming means and said flask.

19. In a molding machine of the class described, the combination of a continuously moving carrier adapted to convey flasks in predetermined positions thereon through different steps of a mold forming cycle, sand ramming means adapted to compact the sand within said flasks, a rotating driving member moving in synchronism with said carrier, a rotating driven member operatively connected to said sand ramming means for causing movement of the latter along the path of movement of said carrier, and means for operatively connecting said members for causing movement of said sand ramming means with said carrier, said connecting means only being operable to positively connect said members when said sand ramming means is in operative registration with one of said flasks.

20. In a molding machine, the combination of means for imparting continuous movement to successive flasks through a given path, means spaced along said path for performing a number of operations on the flasks during said continuous movement, and means for lifting each flask from its associated pattern during the continuous movement of said flasks in said path after the completion of said cycle of operations.

21. In a molding machine, the combination of a continuously moving carrier supporting a plurality of patterns and adapted to receive flasks in operative association with said patterns for continuously conveying the same through different steps of a mold forming cycle, means for performing said steps as the carrier is continuously moved, and means for automatically lifting each flask from its associated pattern.

22. In a molding machine, the combination of a continuously moving carrier provided with a plurality of patterns and adapted to support flasks in co-planar relationship and in association with said patterns for movement through different steps of a mold forming cycle, and means operating automatically during the continuous movement of said carrier for drawing the flasks from their associated patterns after the completion of the mold in each flask.

23. In a molding machine, the combination of a horizontally moving carrier adapted to convey flasks and associated patterns through a predetermined path for the performance of mold forming operations on said flasks, and means moving upwardly through said carrier for lifting each flask from its associated pattern at a predetermined point in the movement of said carrier.

24. In a molding machine, the combination of a rotating table supporting a plurality of patterns in predetermined positions thereon, said table being adapted to receive flasks associated with each of said patterns for conveying said flasks through a mold forming cycle, and automatic flask drawing means associated with each of said pattern positions for automatically lifting each flask from its associated pattern at the completion of the mold forming cycle.

25. In a molding machine, the combination of a rotating table, a plurality of patterns secured to said table in predetermined positions thereon, said table being adapted to receive flasks over each of said patterns for conveying said flasks through a mold forming cycle, flask drawing means associated with each of said pattern positions and comprising a plurality of rods movable upwardly through said table for lifting the flask from its associated pattern, and means for automatically actuating each of said flask drawing means at a predetermined point in the rotation of said table.

26. In a molding machine, the combination of a rotating table, a plurality of patterns secured to said table at different spaced positions thereon, said table being adapted to receive flasks over said patterns for conveying said flasks through a mold forming cycle, a plurality of flask drawing mechanisms carried by said table and associated with each of said patterns, each of said flask drawing mechanisms comprising a plurality of rods having guided support below said table and movable upwardly into engagement with its associated flask through openings in the table, a spider connecting the several rods of each mechanism, a swinging arm operatively connected to said spider, and cam means adapted to be engaged by the swinging arm of each flask drawing mechanism at a predetermined point in the rotation of said table.

27. In a molding machine, the combination of a rotating table, a plurality of patterns secured at spaced points to the surface of said table, said table being adapted to receive flasks placed over said patterns, registering means for maintaining proper registry between each flask and its associated pattern, and a separate flask drawing mechanism associated with each of said patterns, each of said flask drawing mechanisms comprising a frame secured to the underside of said table and having a plurality of vertically extended guide surfaces, a plurality of rods engaging with said guide surfaces and movable upwardly through openings in said table for lifting the associated flask, a spider connected to each of said rods, a rock shaft carried by said frame, an arm extending from said rock shaft and operatively connected to said spider, a second arm extending from said rock shaft, and a stationary cam adapted to be engaged by said second arm at a predetermined point in the rotation of said table.

28. In a molding machine, the combination of a moving carrier adapted to convey flasks and cooperating patterns in a sand mold forming operation, and means for rapping said patterns during the movement thereof to aid in separating the sand in said flasks from said patterns.

29. In a molding machine, the combination of a moving carrier adapted to convey flasks and cooperating patterns in a sand mold forming operation, and means operating automatically to rap said patterns when the latter reach a predetermined point in the path of said carrier to aid in separating the sand in said flasks from said patterns.

30. In a molding machine, the combination of a continuously moving carrier adapted to convey flasks and associated patterns through different steps of a sand mold forming cycle, and means for automatically rapping said patterns during a predetermined part of the continuous movement of the latter to aid in separating the sand in said flasks from said patterns.

31. In a molding machine, the combination of means for imparting continuous movement to successive flasks in association with successive patterns through a given path, and electrically operated means for automatically rapping said patterns during a predetermined part of the continuous movement thereof in said path.

32. In a molding machine, the combination of a rotating table adapted to convey flasks and associated patterns through different steps of a mold forming cycle, electrically operated devices carried by said table and adapted to rap each of the patterns thereon, and means operating automatically to energize said devices preparatory to removing the associated flask from said table.

33. In a molding machine, the combination of a rotating table, a plurality of patterns secured to said table, said table being adapted to receive flasks over each of said patterns, electrical solenoids mounted on said table adjacent each of said patterns and operative to rap said patterns, contact members rotating with said table and electrically connected to said solenoids, and stationary contact terminals connected to a source of current supply and arranged to energize said solenoids through said contact members at a predetermined point in the rotation of said table.

34. In a molding machine, the combination of a continuously moving carrier adapted to convey flasks through a given path, a series of follow frames travelling with said carrier and manually movable into and out of operative positions relative to said flasks, and detent means for releasably holding said flasks in one of said positions.

35. In a molding machine, the combination of a continuously moving carrier adapted to convey flasks through a given path, a series of manually operated follow frames connected to said carrier to travel therewith, said follow frames being adapted to engage with said flasks to increase the effective depth of each flask, and spring means for holding said frames in their operative and inoperative positions.

36. In a molding machine, the combination of a rotating table adapted to convey flasks through different steps of a mold forming cycle, a series of follow frames pivotally supported above said table and rotating therewith, said follow frames having swinging movement between an upper position out of engagement with its associated flask and a lower position engaging with the upper part of said flask, and biasing spring means operative to yieldingly hold each follow frame in either of said positions.

37. In a molding machine, the combination of a carrier adapted to convey successive molding flasks through a given path with a continuous movement, power operated means for ramming sand in said flasks during such movement, and means for causing relative separation between each flask and its associated pattern during such movement.

38. In a molding machine, the combination of a carrier adapted to convey successive molding flasks through a given path with a continuous movement, means for introducing sand into said flasks, power operated means for ramming the sand into said flasks, and means for causing relative separation between each flask and its associated pattern, each of said above named means performing its described operation while said flasks are in continuous movement on said carrier.

39. In a molding machine, the combination of an upright standard, a table rotatably supported on said standard and adapted to convey flasks and associated patterns through a mold forming cycle, sand delivery mechanism supported above said table for discharging sand into said flasks, a sleeve rotatably supported on said standard above said table, a sand ramming unit carried by said sleeve, and arranged for swinging concurrently with the movement of said table for performing its sand ramming operation in each flask, and flask drawing mechanisms carried by said table and operating automatically to draw each flask from its associated pattern subsequent to the operation of the sand ramming unit.

40. In a molding machine, the combination of a vertical standard, a sleeve rotatably mounted on said standard, a mold carrying surface supported on said sleeve, a split spur gear secured to said sleeve, a pinion meshing therewith, a split housing enclosing said gear and pinion, a worm wheel and worm driving said pinion, a drive shaft adapted to have power transmitted thereto, and speed varying mechanism connecting said drive shaft with said worm.

41. In a molding machine, the combination of a vertical standard, a sleeve rotatably mounted on said standard, a mold carrying surface supported on said sleeve, a large spur gear secured to said sleeve, a pinion meshing therewith, a housing inclosing said gear and pinion, a drive shaft adapted to have power transmitted thereto, and speed varying mechanism connecting said drive shaft with said pinion.

NATHAN LESSER.
MAX SKLOVSKY.